United States Patent [19]
Schröder et al.

[11] Patent Number: 6,153,734
[45] Date of Patent: Nov. 28, 2000

[54] OLIGOMER AZO COLORANTS

[75] Inventors: Gunter-Rudolf Schröder, Mannheim; Torsten Freund, Limburgerhof; Udo Mayer; Karl-Heinz Etzbach, both of Frankenthal, all of Germany

[73] Assignee: BASF Aktiengesellschaft, Ludwigshafen, Germany

[21] Appl. No.: 09/403,761

[22] PCT Filed: Apr. 16, 1998

[86] PCT No.: PCT/EP98/02240

§ 371 Date: Nov. 1, 1999

§ 102(e) Date: Nov. 1, 1999

[87] PCT Pub. No.: WO98/50470

PCT Pub. Date: Nov. 12, 1998

[30] Foreign Application Priority Data

May 2, 1997 [DE] Germany ............... 19718659

[51] Int. Cl.$^7$ .......... C09B 35/64; C09B 69/10; C09B 67/22; D06P 3/32; C09D 11/02
[52] U.S. Cl. .......... 534/679; 534/685; 534/582; 8/437; 8/919
[58] Field of Search .............. 534/679, 685

[56] References Cited

U.S. PATENT DOCUMENTS 5,597,387  1/1997  Bauer et al. ............... 8/437

FOREIGN PATENT DOCUMENTS 217060  4/1987  European Pat. Off. .
712903  5/1996  European Pat. Off. .
244349  4/1987  Germany .
785084  10/1957  United Kingdom .

OTHER PUBLICATIONS

Patent Abstracts of Japan, vol. 005, No. 024 (C–043), Feb. 13, 1981.

*Primary Examiner*—Fiona T. Powers
*Attorney, Agent, or Firm*—Oblon, Spivak, McClelland, Maier & Neustadt, P.C.

[57] ABSTRACT

Oligomeric azo dyes having an alternating construction made up of tetrazo components and coupling components, containing in the molecule at least 2 units of the structure I $$\text{---[D---K]---} \qquad (I)$$

where D and K are as defined in the specification, are prepared and used alone or in mixtures for dyeing and printing natural or synthetic substrates.

12 Claims, No Drawings

OLIGOMER AZO COLORANTS

This application is a 371 of PCT/EP98/02240 filed Apr. 16, 1998.

DESCRIPTION

The present invention relates to oligomeric azo dyes having an alternating construction made up of tetrazo components and coupling components, containing in the molecule at least 2 units of the structure I

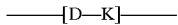  (I)

where D is a tetrazo component of the formula II

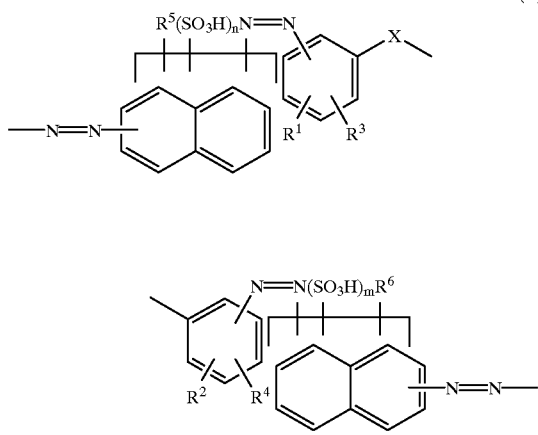

where n is 1 or 2, m is 1 or 2, x is a direct bond, oxygen, sulfur or a bridge member of the formula —NHCO—, —NHCONH—, —CO—, —NHSO$_2$—, —SO$_2$NHSO$_2$—, —SO$_2$—, —SO$_2$—NH—A—NH—SO$_2$—, —NAlk—CO—, —NAlk—CO—NAlk—, —NAlk—CO—NH—, —NAlk—SO$_2$—, —SO$_2$—NAlk—SO$_2$—, —SO$_2$—NAlk—A—NAlk—SO$_2$—, —SO$_2$—NAlk—A—NH—SO$_2$—, —CH=CH—, —CH$_2$CH$_2$—, —C(CH$_3$)$_2$—, —CH$_2$— or —NH—, $R^1$ and $R^2$ are each independently of the other hydrogen, $C_1$–$C_4$-alkyl, $C_1$–$C_4$-alkoxy, $C_1$–$C_4$-alkanoyl, cyano, carboxyl, hydroxysulfonyl, $C_1$–$C_4$-alkoxycarbonyl, hydroxyl, carbamoyl, mono- or di-$C_1$–$C_4$-alkylcarbamoyl, sulfamoyl, mono- or di-$C_1$–$C_4$-alkylsulfamoyl, fluorine, chlorine, bromine, nitro or trifluoromethyl, $R^3$ and $R^4$ are each independently of the other hydrogen, hydroxysulfonyl or carboxyl, $R^5$ and $R^6$ are each independently of the other hydrogen or hydroxyl, Alk is $C_1$–$C_4$-alkyl with or without hydroxyl, cyano, mono- or di-$C_1$–$C_4$-alkylamino, amino, carboxyl, hydroxysulfonyl, $C_1$–$C_4$-alkoxycarbonyl, carbamoyl, mono- or di-$C_1$–$C_4$-alkylcarbamoyl, sulfamoyl, mono- or di-$C_1$–$C_4$-alkylsulfamoyl or morpholinylcarbonyl substitution and with or without interruption by 1 oxygen atom, and A is phenylene with or without hydroxysulfonyl substitution, and where K is a bivalent radical of a coupling component of the formula III

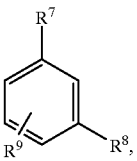  (III)

where $R^7$ and $R^8$ are each independently of the other hydroxyl, amino, morpholino, —NHAlk or —N(Alk)$_2$, and $R^9$ is hydrogen, carboxyl, hydroxysulfonyl, $C_1$–$C_4$-alkoxycarbonyl, carbamoyl, mono- or di-$C_1$–$C_4$-alkylcarbamoyl, sulfamoyl, mono- or di-$C_1$–$C_4$-alkylsulfamoyl, —Alk, —OAlk, —NHAlk or —N(Alk)$_2$, to a process for their preparation, to their use for dyeing and printing natural or synthetic substrates and also to mixtures comprising the novel dyes.

DD-A-244 349 describes black pentakisazo dyes obtained by coupling of tetrazotized 4,4'-diaminophenylamine-2-sulfonic acid onto 2-amino-8-hydroxynaphthalene-6-sulfonic acid, renewed tetrazotization, simple coupling onto 1,3-diaminobenzene-4-sulfonic acid and two successive coupling steps.

DE-A-44 41 232 teaches the coupling of one equivalent of tetrazotized 4,4'-diaminodiphenylamine-2-sulfonic acid onto 2 equivalents of 2-amino-8-hydroxynaphthalene-6-sulfonic acid, subsequent tetrazotization and renewed coupling onto 2 equivalents of 3-hydroxyphenyliminodiacetic acid to form tetrakisazo dyes.

A common feature of these dyes is their unsatisfactory fastness. The wet and perspiration fastnesses are inadequate on leather especially.

It is an object of the present invention to provide novel azo dyes having advantageous application properties, especially good wet and perspiration fastness properties.

We have found that this object is achieved by the oligomeric azo dyes defined at the beginning.

Since the oligomeric azo dyes contain a plurality of hydroxysulfonyl groups and also, optionally, carboxyl groups, their salts are comprehended by the invention, too.

Suitable salts are metal or ammonium salts. Metal salts are especially the lithium, sodium or potassium salts. Ammonium salts for the purposes of the invention are salts having either unsubstituted or substituted ammonium cations. Examples of substituted ammonium cations are monoalkyl-, dialkyl-, trialkyl-, tetraalkyl- or benzyltrialkyl-ammonium cations or cations derived from nitrogenous five- or six-membered saturated heterocycles, such as pyrrolidinium, piperidinium, morpholinium or piperazinium cations or their N-monoalkyl- or N,N-dialkyl-substituted products. Alkyl here is generally to be understood as meaning straight-chain or branched $C_1$–$C_{20}$-alkyl with or without substitution by from 1 to 3 hydroxyl groups and with or without interruption by from 1 to 4 oxygen atoms in ether function.

Any substituted alkyl appearing in the abovementioned formulae generally has 1 or 2 substituents, especially one substituent.

The phenylene group A is preferably 1,3- or 1,4-phenylene. If substituted, it generally bears 1 or 2, preferably one, hydroxysulfonyl radical.

$R^1$, $R^2$, $R^9$ and Alk are each for example methyl, ethyl, propyl, isopropyl, butyl, isobutyl, sec-butyl or tert-butyl.

$R^1$, $R^2$ and $R^9$ may each also be for example methoxy, ethoxy, propoxy, isopropoxy, butoxy, sec-butoxy or tert-butoxy.

$R^1$, $R^2$ and $R^9$ may each also be methoxycarbonyl, ethoxycarbonyl, propoxycarbonyl, isopropoxycarbonyl, butoxycarbonyl, sec-butoxycarbonyl, tert-butoxycarbonyl, mono- or dimethylcarbamoyl, mono- or diethylcarbamoyl, mono- or dipropylcarbamoyl, mono- or dibutylcarbamoyl, mono- or dimethylsulfamoyl, mono- or diethylsulfamoyl, mono- or dipropylsulfamoyl or mono- or dibutylsulfamoyl.

$R^1$ and $R^2$ may each also be for example formyl, acetyl, propionyl or butyryl.

Alk may each also be for example hydroxymethyl, 2-hydroxyethyl, 2- or 3-hydroxypropyl, 2- or 4-hydroxybutyl, cyanomethyl, 2-cyanoethyl, 2- or 3-cyanopropyl, 2- or 4-cyanobutyl, carboxymethyl, 2-carboxyethyl, 2- or 3-carboxypropyl, 2- or 4-carboxybutyl, hydroxysulfonylmethyl, hydroxysulfonylethyl, 2- or 3-hydroxysulfonylpropyl, 2- or 4-hydroxysulfonylbutyl, methoxycarbonylmethyl, methoxycarbonylethyl, 2- or 3-methoxycarbonylpropyl, 2- or 4-methoxycarbonylbutyl, ethoxycarbonylmethyl, ethoxycarbonylethyl, 2- or 3-ethoxycarbonylpropyl, 2- or 4-ethoxycarbonylbutyl, carbamoylmethyl, 2-carbamoylethyl, 2- or 3-carbamoylpropyl, 2- or 4-carbamoylbutyl, mono- or dimethylcarbamoylmethyl, 2-mono- or 2-dimethylcarbamoylethyl, 2- or 3-mono- or 2- or 3-dimethylcarbamoylpropyl, 2- or 4-mono- or 2- or 4-dimethylcarbamoylbutyl, mono- or diethylcarbamoylmethyl, 2-mono or 2-diethylcarbamoylethyl, 2- or 3-mono- or 2- or 3-diethylcarbamoylpropyl, 2- or 4-mono- or 2- or 4-diethylcarbamoylbutyl, sulfamoylmethyl, 2-sulfamoylethyl, 2- or 3-sulfamoylpropyl, 2- or 4-sulfamoylbutyl, mono- or dimethylsulfamoylmethyl, 2-mono or 2-dimethylsulfamoylethyl, 2- or 3-mono- or 2- or 3-dimethylsulfamoylpropyl, 2- or 4-mono- or 2- or 4-dimethylsulfamoylbutyl, mono- or diethylsulfamoylmethyl, 2-mono or 2-diethylsulfamoylethyl, 2- or 3-mono- or 2- or 3-diethylsulfamoylpropyl, 2- or 4-mono- or 2- or 4-diethylsulfamoylbutyl, mono- or dimethylaminomethyl, 2-mono- or dimethylaminoethyl, 2- or 3-mono- or dimethylaminopropyl, 2- or 4-mono- or dimethylaminobutyl, mono- or diethylaminomethyl, 2-mono- or diethylaminoethyl, 2- or 3-mono- or diethylaminopropyl, 2- or 4-mono- or diethylaminobutyl, aminomethyl, 2-aminoethyl, 2- or 3-aminopropyl, 2- or 4-aminobutyl, 2-methoxyethyl or 2-ethoxyethyl.

A is for example 1,2-, 1,3- and 1,4-phenylene, 2-hydroxysulfonyl-1,3-phenylene, 2-hydroxysulfonyl-1,4-phenylene, 2,5-dihydroxysulfonyl-1,4-phenylene or 4,6-dihydroxysulfonyl-1,3-phenylene.

The bridge member X connects to the phenylene rings at each end ortho, meta or para to the respective diazo group. Preference is given to polyazo dyes in which both links are para.

Preference is given to oligomeric azo dyes in which X is a direct bond or a bridge member of the formula —NHCO—, —NHCONH—, —NHSO$_2$—, —SO$_2$—, —CH=CH—, —CH$_2$CH$_2$—, —CH$_2$— and —NH— and in particular a bridge member of the formula —CH=CH—, —NH— or —SO$_2$NH—.

Preference is further given to oligomeric azo dyes in which $R^1$ and $R^2$ are each independently of the other hydrogen, hydroxysulfonyl, carboxyl, sulfamoyl or mono- or di-$C_1$-$C_4$-alkylsulfamoyl, especially hydrogen or hydroxysulfonyl. It is preferable for $R^3$ and $R^4$ to each be hydrogen particularly in combination with the preferred radicals $R^1$ and $R^2$.

Preference is further given to oligomeric azo dyes in which $R^7$ and $R^8$ are each independently of the other hydroxyl or amino.

Oligomeric azo dyes with 1-amino-8-hydroxynaphthalene-4,6-disulfonic acid, 2-amino-8-hydroxynaphthalene-6-sulfonic acid, 3-amino-8-hydroxynaphthalene-6-sulfonic acid and especially with 1-amino-8-hydroxynaphthalene-3,6-disulfonic acid as below-recited coupling components VII are generally preferred.

In particularly preferred oligomeric azo dyes, D is a tetrazo component of the formula IV

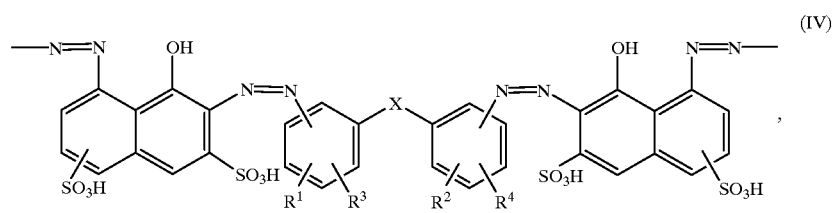

(IV)

where $R^1$, $R^2$, $R^3$, $R^4$ and X are each as defined above.

The oligomeric azo dyes can be prepared using a mixture of different tetrazo components of the formula II as well as a single tetrazo component. Similarly, the claims also comprehend oligomeric azo dyes obtained by mixing a plurality of coupling components III.

The azo dyes of the present invention are obtained on tetrazotizing 1 mol equivalent of a diamine of the formula V

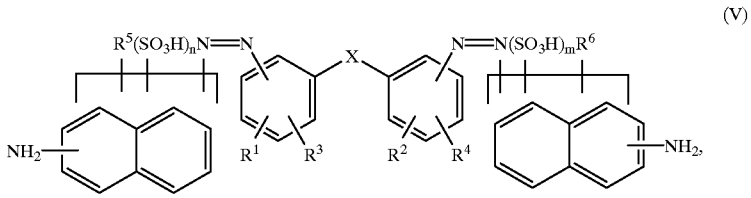

(V)

where $R^1$, $R^2$, $R^3$, $R^4$, $R^5$, $R^6$, X, m and n are each as defined above, and polycondensing the product in a basic medium with from 0.6 to 1.4 mol equivalents of a coupling component III.

Preferably, 1 mol equivalent of diamine V is reacted with from 0.8 to 1.2, particularly preferably from 0.9 to 1.1, very particularly preferably with from 0.97 to 1.03, specifically with 1, mol of coupling component III. The approximated 1:1 stoichiometry, unlike the 1:2 stiochiometry of the prior art, results in polycondensation.

The diamines V used are known and are obtained for example by tetrazotization of one mole equialent of a diamine of the formula VI

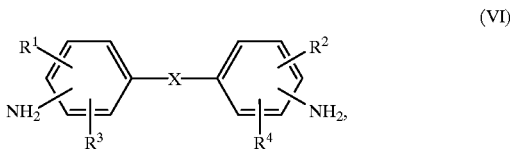

(VI)

where $R^1$, $R^2$, $R^3$ and $R^4$ are each as defined above, and subsequent basic coupling onto from 1.95 to 2.05 mol equivalents of a coupling component of the formula VII

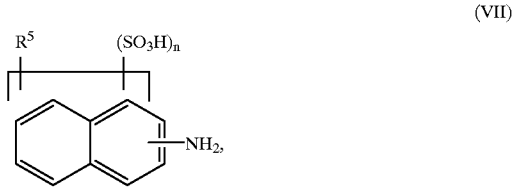

(VII)

where $R^5$ and n are each as defined above. The diamines V thus prepared are preferably tetrazotized without intermediary isolation and used in the form of an aqueous solution in the reaction with the compounds of the general formula III in a basic medium.

By using a mixture of aminonaphthalenesulfonic acids VII or the specific use of asymmetrical diamines V, it is possible to obtain hue variations. Preference is given to using symmetrical diamines V.

Aromatic diamines VI useful as starting materials for diamines V are for example 3,3'-diaminodiphenyl sulfone, 4,4'-diaminodiphenyl sulfone, 4,4'-diaminostilbene-2,2'-disulfonic acid, 2,2'-diaminodiphenyl sulfone, 4,5-disulfo-2,2'-sulfonyldianiline, 4,4'-diaminobenzophenone, 3,3'-diamino-4,4'-dichlorobenzophenone, 4,4'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxybiphenyl, 4,4'-diaminobiphenyl-2,2'- or -3,3'-disulfonic acid, 4,4'-diaminobiphenyl-2,2'- or -3,3'-dicarboxylic acid, 4,4'-diamino-3-ethoxy- or -3-hydroxy-sulfonylbiphenyl, 4,4'-diaminodiphenylmethane, 4,4'-diamino-3,3'-dimethyldiphenylmethane, 4,4'-diaminodiphenylethane, 4,4'-diaminostilbene or 4,4'-diaminodiphenylmethane-3,3'-dicarboxylic acid, 4,4'-diaminodiphenylamine, 4,4'-diaminodiphenylamine-2-sulfonic acid, 4,4'-diaminodisulfanilamide and N-(4-aminophenyl)-4-aminobenzenesulfonamide.

In what follows, aminonaphtholsulfonic acids are recited as coupling component VII by way of example. Specific examples are 1-amino-5-hydroxynaphthalene-7-sulfonic acid, 1-amino-8-hydroxynaphthalene-4-sulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-naphthylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid or 2-naphthylamine-6,8-disulfonic acid.

Coupling components of the formula III include 3-hydroxyphenyliminodiacetic acid, especially resorcinol, 2-methylresorcinol, 4-methylresorcinol, 1,3-phenylenediamine, 3-aminophenol, 4-methyl-3-aminophenol, 5-amino-2-methylphenol, 4-ethyl-3-aminophenol, 2,4-diaminotoluene, 2,4-dihydroxybenzoic acid and 2,4-diaminobenzenesulfonic acid.

The coupling component can be added a little at a time. The diamines V or VI are tetrazotized in a conventional manner, for example with sodium nitrite under acidic conditions usually at from −5° C. to 25° C. The nitrite is generally used in excess, and after the tetrazotization the excess nitrite is destroyed with sulfamic acid, for example.

The coupling steps are advantageously carried out in an aqueous medium. The temperature is generally within the range from −5 to 25° C. for both steps.

The basic coupling step is carried out at a pH above 7, preferably within the range from 7.5 to 13. The adjustment of the desired pH to higher values and, if necessary, its maintenance during the coupling are effected as commonly known by addition of ammonium bases or alkali metal bases, eg. sodium or potassium hydroxide, carbonate or acetate.

The basic coupling is carried on to complete conversion. The end of the reaction is readily determined from the decrease in the tetrazo component. Typically, the end-point is reached within from about 15 minutes to 2 hours of the last addition.

Longer stirring times are possible, but generally have no effect on the degree of polymerization. For safety reasons, it is advisable to raise the temperature of the reaction mixture briefly to around 50° C. after coupling has taken place in order that last traces of diazo component may be destroyed.

In the polycondensation step, chain termination is thought to be brought about, for example, by further coupling onto a coupling component which no longer has a reactive end or by decomposition of diazonium salt.

The degree of polycondensation of the azo dyes of the present invention is dependent on synthesis conditions, starting materials and their stoichiometry. However, presumably the degree of polycondensation does not exceed 100, because of termination reactions.

Particular preference is given to oligomeric azo dyes whose average repeat unit of the formula I is at least 3.

The azo dyes obtainable by the above-described processes are mixtures having an average degree of polycondensation. Their separation is possible, but not necessary. Advantageously, the dye mixtures obtainable by the process of the present invention are used without further separation.

The oligomeric azo dyes of the present invention are readily soluble in water at a pH above 8.

The dyes of the present invention are advantageously useful for dyeing natural or synthetic substrates, for example cotton, wool, polyamide and especially leather. They are further useful as paper dyes for pulp dyeing and recording fluids such as inks, especially for ink-jet printing.

The dyes of the present invention can also be used for dyeing keratinous fibers, for example in hair dyeing or dyeing of furs.

The dyeings obtained have good wet and perspiration fastness properties.

The novel dyes may be used alone, mixed with each or one another and mixed with other dyes.

The Examples which follow illustrate the invention.

EXAMPLE 1 a) 9.26 g (0.025 mol) of 4,4'-diaminostilbene-2,2'-disulfonic acid were dissolved in a mixture of 75 ml of water and 2.75 ml of 50% strength by weight aqueous sodium hydroxide solution and admixed with 15.5 ml of 3.3M sodium nitrite solution. This solution was added to a mixture of 20 ml of concentrated hydrochloric acid and 100 g of ice. After subsequent stirring at 0–5° C. for 3 h, the excess nitrite was removed with sulfamic acid.

b) A solution of 15.97 g (0.05 mol) of 1-amino-8-hydroxy-3,6-naphthalenedisulfonic acid in 200 ml of water was prepared by setting a pH of 8–9 with 50% strength by weight aqueous sodium hydroxide solution. The diazonium salt solution described under a) was added dropwise at 10° C. over 30 min while the pH was maintained at 8.5 with 1.25M sodium carbonate solution. The mixture was subsequently stirred at 10° C. for 2 h and at room temperature for 15 h. The resulting dispersion was admixed with 15.5 ml of 3.3M sodium nitrite solution and then cooled down to 5C. 20 ml of concentrated hydrochloric acid were then added dropwise and stirred in at 5–10° C. for 3 h. The nitrite excess was then removed with sulfamic acid. To this mixture were added 2.75 g (0.025 mol) of resorcinol, which had been dissolved in 100 ml of water with the aid of 50% strength by weight aqueous sodium hydroxide solution. A pH of 8.5–9 was set with 50% strength by weight aqueous sodium hydroxide solution, and the batch was subsequently stirred at 10° C. for 2 h and at room temperature for 15 h. The pH was then adjusted to 1.5 with concentrated hydrochloric acid, and the precipitated dye was filtered off and dried, leaving 28.2 g of a black dye powder (97% of theory). The dye dyed pure chrome leather in a bluish black having good fastness properties.

Example 1 was repeated with the Table 1 diamines (25 mmol), aminonaphthalenesulfonic acids VII (50 mmol) and coupling components III (25 mmol) to obtain dyes having good fastness properties on leather.

TABLE 1

| Ex. | Diamine | Aminonaphthalenesulfonic acid VII | Coupling component III | Color (Pure chrome leather) |
|---|---|---|---|---|
| 1.2 | 4,4'-diaminostilbene-2,2'-disulfonic acid | 7-amino-1-naphthol-3-sulfonic acid | resorcinol | reddish black |
| 1.3 | 4,4'-diaminostilbene-2,2'-disulfonic acid | 6-amino-1-naphthol-3-sulfonic acid | resorcinol | violetish black |
| 1.4 | 4,4'-diaminostilbene-2,2'-disulfonic acid | 1-amino-8-naphthol-4,6-disulfonic acid | resorcinol | black |
| 1.5 | 4,4'-diaminostilbene-2,2'-disulfonic acid | 1-amino-8-naphthol-2,4-disulfonic acid | resorcinol | brown |
| 1.6 | 4,4'-diaminostilbene | 1-amino-8-naphthol-3,6-disulfonic acid | resorcinol | bluish black |
| 1.7 | 4,4'-diaminostilbene | 7-amino-1-naphthol-3-sulfonic acid | resorcinol | bluish black |
| 1.8 | 4,4'-diaminostilbene | 6-amino-1-naphthol-3-sulfonic acid | resorcinol | violet |
| 1.9 | 4,4'-diaminostilbene | 1-amino-8-naphthol-4,6-disulfonic acid | resorcinol | bluish black |
| 1.10 | 4,4'-diaminostilbene | 1-amino-8-naphthol-2,4-disulfonic acid | resorcinol | brown |
| 1.11 | 4-amino-N-(4-aminophenyl)benzenesulfonamide | 1-amino-8-naphthol-3,6-disulfonic acid | resorcinol | violetish black |
| 1.12 | 4-amino-N-(4-aminophenyl)benzenesulfonamide | 7-amino-1-naphthol-3-sulfonic acid | resorcinol | reddish brown |
| 1.13 | 4,4'diamino(diphenyl-amine)-2-sulfonic acid | 1-amino-8-naphthol-3,6-disulfonic acid | resorcinol | violetish black |
| 1.14 | 4,4'-diamino(diphenyl-amine)-2-sulfonic acid | 7-amino-1-naphthol-3-sulfonic acid | resorcinol | bluish gray |
| 1.15 | 4,4'-diamino(diphenyl-amine)-2-sulfonic acid | 6-amino-1-naphthol-3-sulfonic acid | resorcinol | bluish black |
| 1.16 | 4,4'-diamino(diphenyl-amine)-2-sulfonic acid | 1-amino-8-naphthol-4,6-disulfonic acid | resorcinol | bluish black |
| 1.17 | 4,4'-diamino(diphenyl-amine)-2-sulfonic acid | 1-amino-8-naphthol-2,4-disulfonic acid | resorcinol | brown |

TABLE 1-continued

| Ex. | Diamine | Amino-naphthalene-sulfonic acid VII | Coupling component III | Color (Pure chrome leather) |
|---|---|---|---|---|
| 1.18 | 4,4'-diamino-benzanilide | 1-amino-8-naphthol-3,6-disulfonic acid | resorcinol | violetish black |
| 1.19 | 2,5-bis(4-aminophenyl)-pyrimidine | 1-amino-8-naphthol-3,6-disulfonic acid | resorcinol | violetish black |
| 1.20 | 4,4'-diaminostilbene-2,2'-disulfonic acid | 1-amino-8-naphthol-3,6-disulfonic acid | 3-amino-phenol | bluish black |
| 1.21 | 4,4'-diaminostilbene-2,2'-disulfonic acid | 1-amino-8-naphthol-4,6-disulfonic acid | 3-amino-phenol | bluish black |
| 1.22 | 4,4'-diaminostilbene-2,2'-disulfonic acid | 7-amino-1-naphthol-3-sulfonic acid | 3-amino-phenol | violetish black |
| 1.23 | 4,4'-diamino(diphenyl-amine)-2-sulfonic acid | 1-amino-8-naphthol-3,6-disulfonic acid | 3-amino-phenol | bluish black |
| 1.24 | 4,4'-diamino(diphenyl-amine)-2-sulfonic acid | 1-amino-8-naphthol-4,6-disulfonic acid | 3-amino-phenol | bluish black |
| 1.25 | 4,4'-diamino(diphenyl-amine)-2-sulfonic acid | 7-amino-1-naphthol-3-sulfonic acid | 3-amino-phenol | violetish brown |
| 1.26 | 4,4'-diaminostilbene | 1-amino-8-naphthol-3,6-disulfonic acid | 3-amino-phenol | violetish black |
| 1.27 | 4,4'-diaminostilbene | 1-amino-8-naphthol-4,6-disulfonic acid | 3-amino-phenol | violetish black |
| 1.28 | 4,4'-diaminostilbene | 7-amino-1-naphthol-3-sulfonic acid | 3-amino-phenol | violet |
| 1.29 | 4,4'-diaminostilbene-2,2'-disulfonic acid | 1-amino-8-naphthol-3,6-disulfonic acid | 1,3-diamino-benzene | violet |
| 1.30 | 4,4'-diaminostilbene-2,2'-disulfonic acid | 1-amino-8-naphthol-4,6-disulfonic acid | 1,3-diamino-benzene | violetish black |
| 1.31 | 4,4'-diaminostilbene-2,2'-disulfonic acid | 7-amino-1-naphthol-3-sulfonic acid | 1,3-diamino-benzene | violet |
| 1.32 | 4,4'-diamino(diphenyl-amine)-2-sulfonic acid | 1-amino-8-naphthol-3,6-disulfonic acid | 1,3-diamino-benzene | bluish black |
| 1.33 | 4,4'-diamino(diphenyl-amine)-2-sulfonic acid | 1-amino-8-naphthol-4,6-disulfonic acid | 1,3-diamino-benzene | violetish black |
| 1.34 | 4,4'-diamino(diphenyl-amine)-2-sulfonic acid | 7-amino-1-naphthol-3-sulfonic acid | 1,3-diamino-benzene | bluish black |
| 1.35 | 4,4'-diamino(diphenyl-amine)-2-sulfonic acid | 7-amino-1-naphthol-3-sulfonic acid | 1,3-diamino-benzene | violetish black |
| 1.36 | 4,4'-diaminostilbene | 1-amino-8-naphthol-3,6-disulfonic acid | 1,3-diamino-benzene | violet |
| 1.37 | 4,4'-diaminostilbene | 1-amino-8-naphthol-4,6-disulfonic acid | 1,3-diamino-benzene | violetish black |
| 1.38 | 4,4'-diaminostilbene | 7-amino-1-naphthol-3-sulfonic acid | 1,3-diamino-benzene | violet |
| 1.39 | 4,4'-diamino(diphenyl-amine)-2-sulfonic acid | 1-amino-8-naphthol-3,6-disulfonic acid | resorcinol | black |
| 1.40 | 4,4'-diamino(diphenyl-amine)-2-sulfonic acid | 1-amino-8-naphthol-3,6-disulfonic acid | 3-amino-phenol | black |
| 1.41 | 4,4'-diamino(diphenyl-amine)-2-sulfonic acid | 1-amino-8-naphthol-3,6-disulfonic acid | 1,3-diamino-benzene | black |
| 1.42 | 4-amino-N-(4-amino-phenyl)benzene-sulfonamide | 1-amino-8-naphthol-3,6-disulfonic acid | resorcinol | violetish brown |
| 1.43 | 4-amino-N-(4-amino-phenyl)benzene-sulfonamide | 1-amino-8-naphthol-3,6-disulfonic acid | 3-amino-phenol | reddish brown |
| 1.44 | 4-amino-N-(4-amino-phenyl)benzene-sulfonamide | 1-amino-8-naphthol-3,6-disulfonic acid | 1,3-diamino-benzene | reddish brown |
| 1.45 | 4,4'-diamino(diphenyl-amine)-2-sulfonic acid | 1-amino-8-naphthol-4,6-disulfonic acid | resorcinol | reddish black |
| 1.46 | 4,4'-diamino(diphenyl-amine)-2-sulfonic acid | 1-amino-8-naphthol-4,6-disulfonic acid | 3-amino-phenol | bluish black |
| 1.47 | 4,4'-diamino(diphenyl-amine)-2-sulfonic acid | 1-amino-8-naphthol-4,6-disulfonic acid | 1,3-diamino-benzene | black |
| 1.48 | 4-amino-N-(4-amino-phenyl)benzene-sulfonamide | 1-amino-8-naphthol-4,6-disulfonic acid | resorcinol | reddish brown |
| 1.49 | 4-amino-N-(4-amino-phenyl)benzene-sulfonamide | 1-amino-8-naphthol-4,6-disulfonic acid | 3-amino-phenol | reddish brown |
| 1.50 | 4-amino-N-(4-amino-phenyl)benzene-sulfonamide | 1-amino-8-naphthol-4,6-disulfonic acid | 1,3-diamino-benzene | brown |

Example 1 was repeated with the Table 2 diamines (25 mmol), aminonaphthalenesulfonic acids VII (50 mmol) and coupling components III (33 mmol) to obtain dyes having good fastness properties on leather.

TABLE 2

| Ex. | Diamine | Amino-naphthalene-sulfonic acid VII | Coupling component III | Color |
|---|---|---|---|---|
| 2.1 | 4,4'-diaminostilbene-2,2'-disulfonic acid | 7-amino-1-naphthol-3-sulfonic acid | resorcinol | violet |
| 2.2 | 4,4'-diaminostilbene-2,2'-disulfonic acid | 1-amino-8-naphthol-2,4-disulfonic acid | resorcinol | brown |
| 2.3 | 4,4'-diamino(diphenyl-amine)-2-sulfonic acid | 7-amino-1-naphthol-3-sulfonic acid | resorcinol | violetish black |
| 2.4 | 4,4'-diamino(diphenyl-amine)-2-sulfonic acid | 1-amino-8-naphthol-4,6-disulfonic acid | resorcinol | black |
| 2.5 | 4,4'-diamino(diphenyl-amine)-2-sulfonic acid | 7-amino-1-naphthol-3-sulfonic acid | 3-amino-phenol | violetish black |

We claim:

1. An oligomeric azo dye having an alternating construction made up of tetrazo components and coupling components, containing in the molecule at least 2 units of the structure I $$—[D—K]—  \quad (I)$$

where D is a tetrazo component of the formula II

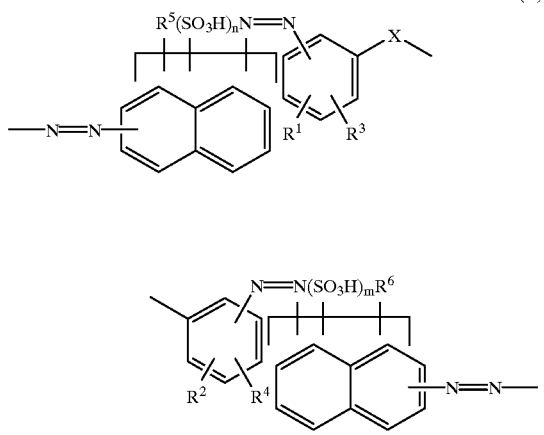

where n is 1 or 2, m is 1 or 2,

X is a direct bond, oxygen, sulfur or a bridge member of the formula —NHCO—, —NHCONH—, —CO—, —NHSO$_2$—, —SO$_2$NHSO$_2$—, —SO$_2$—, —SO$_2$—NH—A—NH—SO$_2$—, —NAlk—CO—, —NAlk—CO—NAlk—, —NAlk—CO—NH—, —NAlk—SO$_2$—, —SO$_2$—NAlk—SO$_2$—, —SO$_2$—NAlk—A—NAlk—SO$_2$—, —SO$_2$—NAlk—A—NH—SO$_2$—, —CH=CH—, —CH$_2$CH$_2$—, —C(CH$_3$)$_2$—, —CH$_2$— or —NH—, $R^1$ and $R^2$ are each independently of the other hydrogen, $C_1$–$C_4$-alkyl, $C_1$–$C_4$-alkoxy, $C_1$–$C_4$-alkanoyl, cyano, carboxyl, hydroxysulfonyl, $C_1$–$C_4$-alkoxycarbonyl, hydroxyl, carbamoyl, mono- or di-$C_1$–$C_4$-alkylcarbamoyl, sulfamoyl, mono- or di-$C_1$–$C_4$-alkylsulfamoyl, fluorine, chlorine, bromine, nitro or trifluoromethyl, $R^3$ and $R^4$ are each independently of the other hydrogen, hydroxysulfonyl or carboxyl, $R^5$ and $R^6$ are each independently of the other hydrogen or hydroxyl, Alk is $C_1$–$C_4$-alkyl with or without hydroxyl, cyano, mono- or di-$C_1$–$C_4$-alkylamino, amino, carboxyl, hydroxysulfonyl, $C_1$–$C_4$-alkoxycarbonyl, carbamoyl, mono- or di-$C_1$–$C_4$-alkylcarbamoyl, sulfamoyl, mono- or di-$C_1$–$C_4$-alkylsulfamoyl or morpholinylcarbonyl substitution and with or without interruption by 1 oxygen atom, and A is phenylene with or without hydroxysulfonyl substitution, and where K is a bivalent radical of a coupling component of the formula III

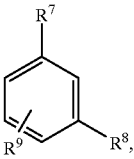

where $R^7$ and $R^8$ are each independently of the other hydroxyl, amino, morpholino, —NHAlk or —N(Alk)$_2$, and $R^9$ is hydrogen, carboxyl, hydroxysulfonyl, $C_1$–$C_4$-alkoxycarbonyl, carbamoyl, mono- or di-$C_1$–$C_4$-alkylcarbamoyl, sulfamoyl, mono- or di-$C_1$–$C_4$-alkylsulfamoyl, —Alk, —OAlk, —NHAlk or —N(Alk)$_2$.

2. An oligomeric azo dye as claimed in claim 1, wherein $R^3$ and $R^4$ are each hydrogen.

3. An oligomeric azo dye as claimed in claim 1, wherein $R^7$ and $R^8$ are each independently of the other hydroxyl or amino.

4. An oligomeric azo dye as claimed in claim 1, wherein X is a direct bond or a bridge member of the formula —NHCO—, —NHCONH—, —NHSO$_2$—, —SO$_2$—, —CH=CH—, —CH$_2$CH$_2$—, —CH$_2$— or —NH—.

5. An oligomeric azo dye as claimed in claim 1, wherein D is a tetrazo component of the formula IV

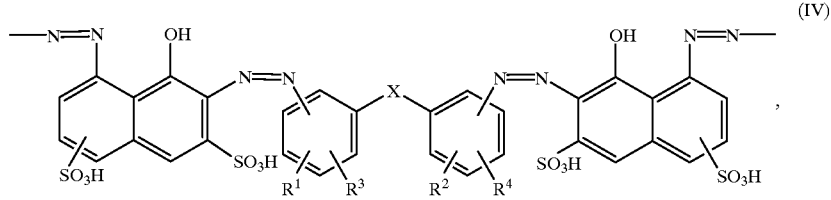

where $R^1$, $R^2$, $R^3$, $R^4$ and X are each as defined in claim 1.

6. A process for preparing oligomeric azo dyes as claimed in claim 1, which comprises tetrazotizing 1 mol equivalent of a diamine of the formula V

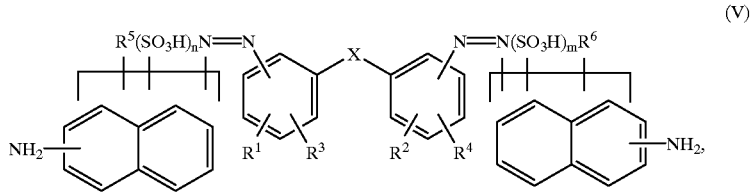

(V)

where $R^1$, $R^2$, $R^3$, $R^4$, $R^5$, $R^6$, X, m and n are each as defined in claim 1, and polycondensing the product in a basic medium with from 0.6 to 1.4 mol equivalents of a coupling component of the formula III mentioned in claim 1.

7. A process for preparing oligomeric azo dyes as claimed in claim 1, which comprises tetrazotizing 1 mol equivalent of a diamine of the formula VI

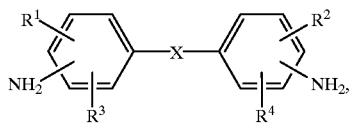

(VI)

where $R^1$, $R^2$, $R^3$ and $R^4$ are each as defined in claim 1, and coupling the product in a basic medium with from 1.95 to 2.05 mol equivalents of a coupling component of the formula VII

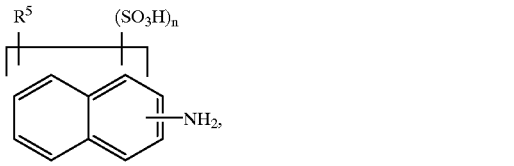

(VII)

where $R^5$ and n are each as defined in claim 1, and then tetrazotizing the product and polycondensing the tetrazotization product in a basic medium with from 0.6 to 1.4 mol equivalents of the coupling component III mentioned in claim 1.

8. A process as claimed in claim 6, wherein 1 mol equivalent of a diamine V is tetrazotized and polycondensed in a basic medium with from 0.8 to 1.2 mol equivalents of a coupling component III.

9. An oligomeric azo dye obtainable by the process of claim 6.

10. An oligomeric azo dye obtainable by the process of claim 7.

11. An oligomeric azo dye obtainable by the process of claim 8.

12. A method dyeing and printing a natural or synthetic substrate comprising contacting the substrate with the oligomeric azo dye of claim 1.

* * * * *